US006697505B2

(12) United States Patent
Yamaguchi et al.

(10) Patent No.: US 6,697,505 B2
(45) Date of Patent: *Feb. 24, 2004

(54) PERSON RECOGNIZING APPARATUS WHICH CAN REDUCE TIME AND YEAR CHANGING EFFECTS AND METHOD THEREFOR

(75) Inventors: Osamu Yamaguchi, Tokyo (JP); Kazuhiro Fukui, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,476

(22) Filed: Jun. 5, 2003

(65) Prior Publication Data

US 2003/0194113 A1 Oct. 16, 2003

Related U.S. Application Data

(63) Continuation of application No. 09/209,281, filed on Dec. 11, 1998, now Pat. No. 6,608,914.

(30) Foreign Application Priority Data

Dec. 12, 1997 (JP) .............................................. 9-342618

(51) Int. Cl.[7] .............................. G06K 9/00; G06K 5/00
(52) U.S. Cl. ........................ 382/118; 382/220; 235/380
(58) Field of Search ........................ 382/115–119, 124, 382/181, 190, 191, 192, 209, 219, 220; 235/380, 382, 382.5; 713/182, 186; 902/3–6; 340/5.52, 5.53, 5.8, 5.83

(56) References Cited

U.S. PATENT DOCUMENTS 3,805,238 A    4/1974 Rothfjell
5,550,928 A    8/1996 Lu et al.
5,559,504 A    9/1996 Itsumi et al.
5,901,244 A    5/1999 Souma et al.
6,049,875 A    4/2000 Suzuki et al.
6,118,888 A    9/2000 Chino et al.
6,230,126 B1   5/2001 Kuroda
6,608,914 B1 * 8/2003 Yamaguchi et al. ........ 382/118

FOREIGN PATENT DOCUMENTS

JP           9-138851           5/1997

OTHER PUBLICATIONS

Akamatsu, "Recent Research on Face Recognition by Computer," The Journal of the Institute of Electronics, Information and Communication Engineers (1997), 80:257–266.

Fukui et al., "Facial Feature Point Extraction Method Based on Combination of Shape Extraction and Pattern Matching," IEICE (1997), vol. J80–D–II:2170–77.

Maeda et al., "A Pattern Matching Method with Local Structure," IEICE (1985), vol. J68–D:345–352.

* cited by examiner

Primary Examiner—Vikkram Bali
(74) Attorney, Agent, or Firm—Finnegan, Henderson, Farabow, Garrett & Dunner, L.L.P.

(57) ABSTRACT

Configuration is made by a feature pattern extracting section 12 for extracting a feature obtainable from a person, a subspace calculating section 14 for calculating a subspace from the feature pattern, a recognition section 16 for effecting recognition using the subspace, a registered information holding section 18 for holding a plurality of the subspaces, and a registered information updating section 20 for updating the registered information using the subspaces. When identifying a person, the effect of aging change is reduced by suppressing time and year changes and keeping the recognition rate high.

6 Claims, 8 Drawing Sheets

FIG.4
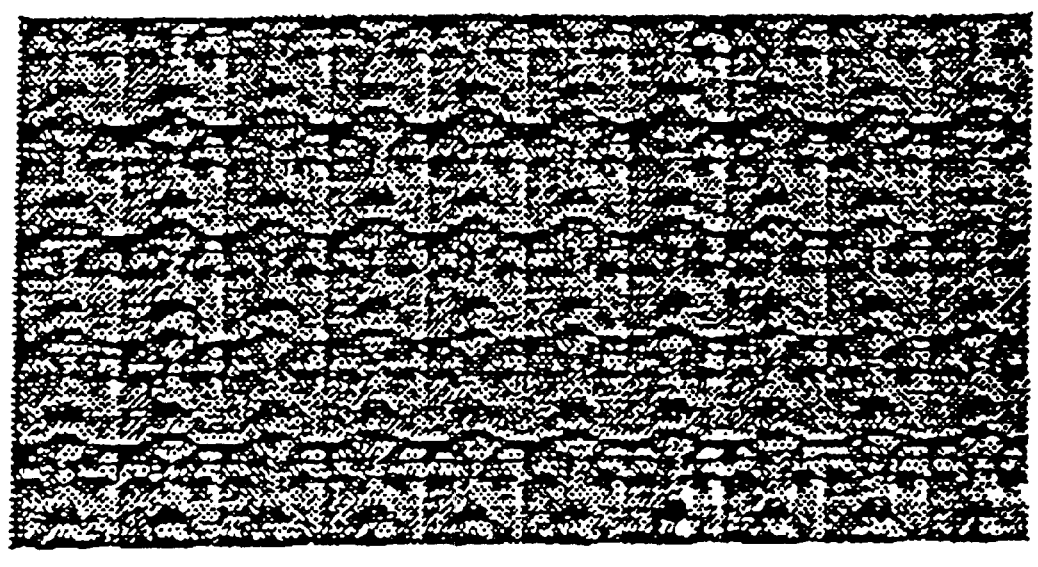
FEATURE VECTOR SET
↓ K-L EXPANSION
FEATURE VECTOR

PERSON RECOGNIZING APPARATUS WHICH CAN REDUCE TIME AND YEAR CHANGING EFFECTS AND METHOD THEREFOR

This is a continuation of application Ser. No. 09/209,281, filed Dec. 11, 1998 now U.S. Pat. No. 6,608,914, which is incorporated herein by reference.

BACKGROUND OF THE INVENTION

1. Field of the Invention

The present invention relates to an apparatus and method for recognizing persons.

2. Description of the Prior Art

Recently there has been a growing concern in security. A person recognition method utilizing human biometrical information involves identification of a person by discriminating in feature patterns between faces, voiceprints, fingerprints, irises and so on.

The face recognition method, among these, is characterized in that data is readily obtainable through a camera or the like without imposing mental or physical burden on the user.

Although the face recognition method have offered various study reports and literatures, there is a document ("Recent Research on Face Recognition by Computer": Shigeru Akamatsu, The Journal of the Institute of electronics, information and communication engineers, vol. 80 No. 3 pp. 257–266 (1997)) disclosed as a survey document. This document reports that a recognition rate drops to 40–60% in the case that a picture is taken long time after entering an face image.

Japanese Patent Laying-open No. H9-138851 discloses a method of writing face information on a card in order to identify whether it is a card owner or not.

Face feature information on the card has to be rewritten in order to avoid card appropriation. In this method, the data is completely substituted by the recognition data from time to time, resulting in automatic decrease in recognition time interval. However, there is a problem that recognition accuracy will be deteriorated if this method is utilized as it is.

In identification of persons, it is generally preferred to utilize unchangeable fingerprint or the like. However, there involves a problem that fingerprint might inflict a mental displeased feeling upon a user.

Non-contact recognition methods includes the use of voiceprint or face, which is effective in obtaining information to distinguish between persons without burdening on the user.

In the case of face, however, there are aging changes due to lapse of time, such as in hair style, makeup, mustache and physical condition or due to lapse of years, such as in growth and maturity. Further, there exist other variation factors such as change in expression and face direction.

The aging change is also true for voiceprint.

FIG. 2 typically represents a similarity degree to entered data on a some person with respect to time. The horizontal axis denotes days from the entry, while the vertical axis represents a similarity degree expressed in 0.0–1.0, wherein 1.0 means identical. As in the figure, it is general that the similarity degree lowers as the number of days are elapsed. The data entry only once is not sufficient for conducting accurate authentication.

SUMMARY OF THE INVENTION

Therefore the present invention provides an apparatus and method for recognizing a person which can reduce the effect of time or year aging change.

The first aspect of the invention is a person recognizing apparatus, comprising: a feature pattern extracting means for extracting a feature pattern obtainable from a person to be recognized; a recognition information calculating means for calculating recognition information containing at least a subspace from the feature pattern extracted by the feature pattern extracting means; a registered information holding means for holding recognition information in multiple manner as registered recognition information; a recognizing means for recognizing the person by using recognition information calculated by the recognition information calculating means or a feature pattern extracted by the feature pattern extracting means and the registered recognition information held in the registered information holding means; a registered information updating means for updating the registered recognition information concerning the person held in the registered information holding means by using the recognition information calculated by the recognition information calculating means or the feature pattern extracted by the feature pattern extracting means.

In the person recognizing apparatus according to the first aspect, the registered information updating means includes an update determining means for determining a predetermined method as to update of the registered recognition information by the registered information holding means, and an update information creating means for creating new registered recognition information based on the update method determined by the update determining means by using the recognition information calculated by the recognition information calculating means or the feature pattern extracted by aid feature pattern extracting means.

In the person recognizing apparatus according to the first aspect, the registered information holding means holds the registered recognition information in plurality of number concerning one objective person or one group, and the recognizing means recognizes with using registered recognition information in plurality of number concerning the one objective person or the one group in the registered information holding means.

In the person recognizing apparatus according to the first aspect, the update determining means selects recognition information to be updated among the recognition information calculated by the recognition information calculating means based on a predetermined rule, and the update information creating means including an update information creating means for creating new registered recognition information by using the selected recognition information by the update determining means.

In the person recognizing apparatus according to the first aspect, the update determining means determines an update condition based on a time of registering or updating the registered recognition information used by the recognizing means, and the update information creating means including an update information creating means for creating new registered recognition information based on the update condition determined by the update determining means.

In the person recognizing apparatus according to the first aspect, the recognizing means makes recognition using a method of calculating a similarity value, and the update determining means using another method of calculating a similarity value different from the method of calculating a similarity value by the recognizing means.

The second aspect of the invention is a person recognizing method comprising: a feature pattern extracting step to extract a feature pattern obtainable from a person to be recognized; a recognition information calculating step to calculate recognition information containing at least a subspace from the calculation amount extracted by the feature pattern extracting step; a registered information holding step to hold recognition information in plurality of number as registered recognition information; a recognizing step to recognize the person by using recognition information calculated by the recognition information calculating step or a feature pattern extracted by the feature pattern extracting step and the registered recognition information held in the registered information holding step; a registered information updating step to update the registered recognition information concerning the person held in the registered information holding step by using the recognition information calculated by the recognition information calculating step or the feature pattern extracted by the feature pattern extracting step.

In the person recognizing method according to the second aspect, the registered information updating step includes an update determining step to determine a predetermined method as to update of the registered recognition information by the registered information holding step, and an update information creating step to create new registered recognition information based on the update method determined by the update determining step by using the recognition information calculated by the recognition information calculating step or the feature pattern extracted by aid feature pattern extracting step.

In the person recognizing method according to the second aspect, the registered information holding step holds the registered recognition information in plurality of number concerning one objective person or one group, and the recognizing step recognizes with using registered recognition information in plurality of number concerning the one objective person or the one group in the registered information holding step.

In the person recognizing method according to the second aspect, the update determining step selects recognition information to be updated among the recognition information calculated by the recognition information calculating step based on a predetermined rule, and the update information creating step including an update information creating step to create new registered recognition information by using the selected recognition information by the update determining step.

In the person recognizing method according to the second aspect, the update determining step determines an update condition based on a time of registering or updating the registered recognition information used by the recognizing step, and the update information creating step including an update information creating step for creating new registered recognition information based on the update condition determined by the update determining step.

In the person recognizing method according to the second aspect, the recognizing step makes recognition using a method of calculating a similarity value, and the update determining step using another method of calculating a similarity value different from the method of calculating a similarity degree by the recognizing step.

The third aspect of the invention is a person recognizing program recording means, comprising: a feature pattern extracting function for extracting a feature pattern obtainable from a person to be recognized; a recognition information calculating function for calculating recognition information containing at least a subspace from the calculation amount extracted by the feature pattern extracting function; a registered information holding function for holding recognition information in plurality of number as registered recognition information; a recognizing function for recognizing the person by using recognition information calculated by the recognition information calculating function or a feature pattern extracted by the feature pattern extracting function and the registered recognition information held in the registered information holding function; a registered information updating function for updating the registered recognition information concerning the person held in the registered information holding function by using the recognition information calculated by the recognition information calculating function or the feature pattern extracted by the feature pattern extracting function.

The invention of the first, second or third aspect can update the registration information and suppress against aging change.

The invention of the first or second aspect may perform automatic updating during authentication, thereby eliminating the necessity of troublesome re-registration and preventing the recognition rate due to aging change from lowering.

The invention of the first or second aspect makes it possible to recognize certain one person according to the registered recognition information in plurality of number. There is no requirement to adjust at all times a person condition in a same state, making possible to cope with large variation in the feature pattern of an objective person. Also, it is possible to image recognition with using any of the registered recognition information in plurality of number, further improving convenience.

BRIEF DESCRIPTION OF THE DRAWINGS

FIG. 4 is a view as an example of a feature pattern;

DESCRIPTION OF THE PREFERRED EMBODIMENTS

The present invention will be explained hereinbelow on one embodiment thereof.

Figure 1:
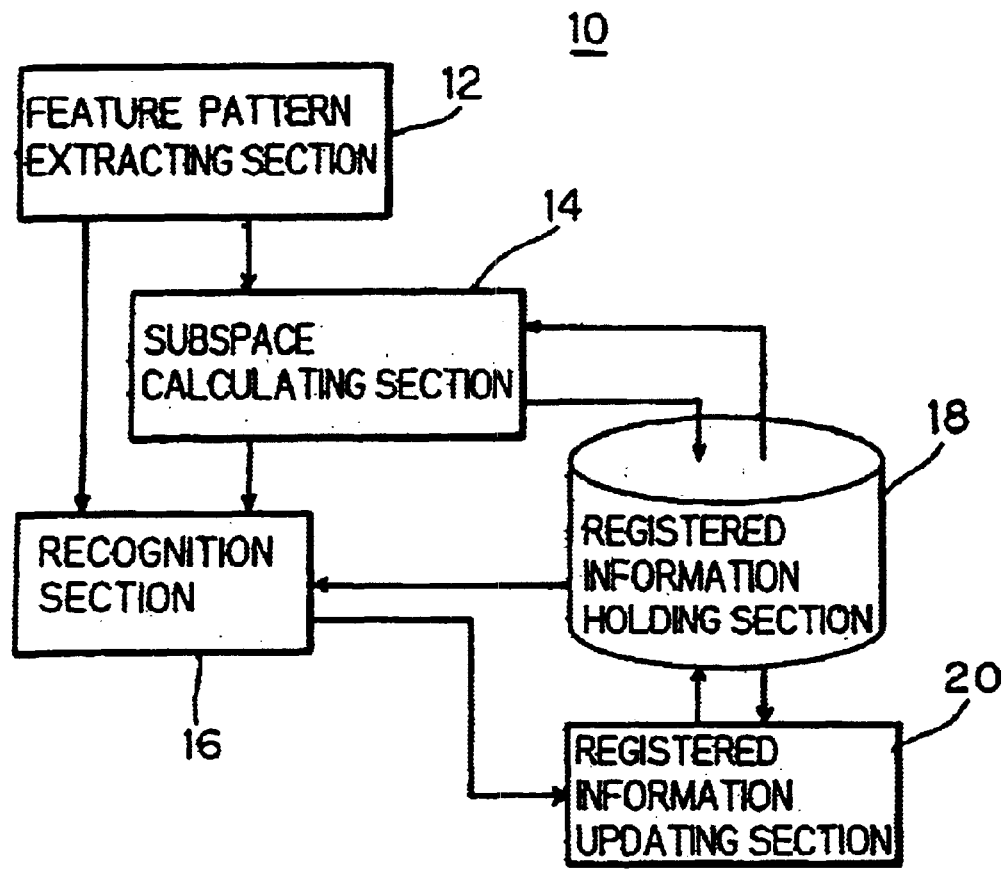
FIG. 1 is a configuration diagram of a person recognizing apparatus 10.
Figure 2:
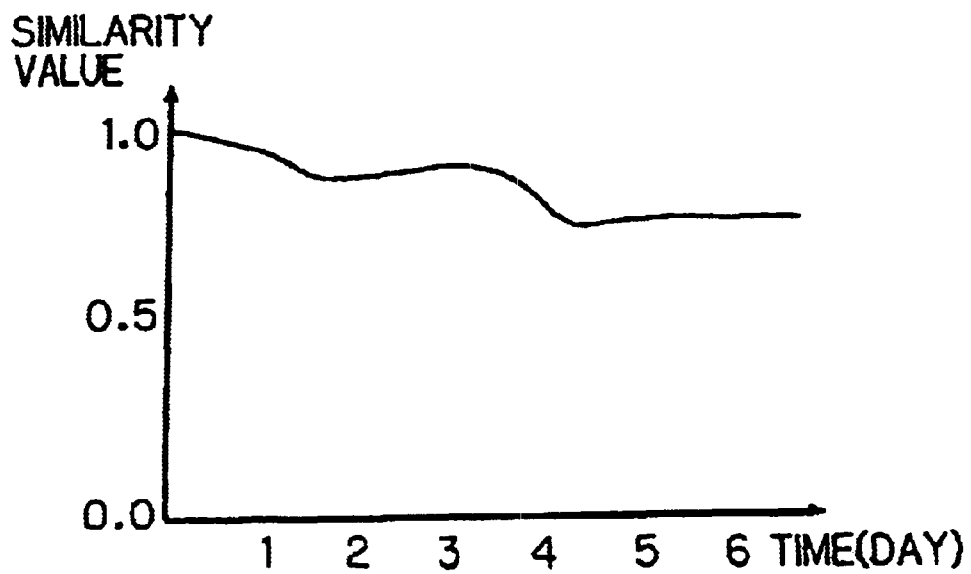
FIG. 2 is a typical graph on aging change.

Here, a person recognizing apparatus 10 is explained as an example, which authenticates on a human face as an object to be recognized by inputting an image through a TV camera in order to detect the face. The person recognizing apparatus 10 comprises, as shown in a configuration diagram of FIG. 1, a feature pattern extracting section 12, a subspace calculating section 14, a recognition section 16, a register information holding section 18 and a register-information updating section 20.

Such a structure is feasible by using a personal computer with a frame grabber connected with a TV camera. In order to give functioning to the structure, a program for functioning this is memorized on a hard disc, CD-ROM, MD, FD, MO, or DVD.

In the below explanation, information will appear which involves image input data, an extracted feature pattern, a subspace, eigenvectors for forming the subspace, a correlation matrix, situational information such as a time, day and hour and a place upon registration, and personal information such as a password number and identification code. Recognition data, when referred to, includes a subspace or eigenvectors for forming the subspace. Registered information, when referred to, includes image input data, an extracted feature pattern, a subspace, eigenvectors for forming the subspace, a correlation matrix, situational information, and personal information. Accordingly, recognition data is included in registered information.

Feature Pattern Extracting Section 12

A feature pattern extracting section 12 is to take a feature pattern from an object, which herein performs facial image analysis through image recognition as shown in FIG. 4.

Figure 3:
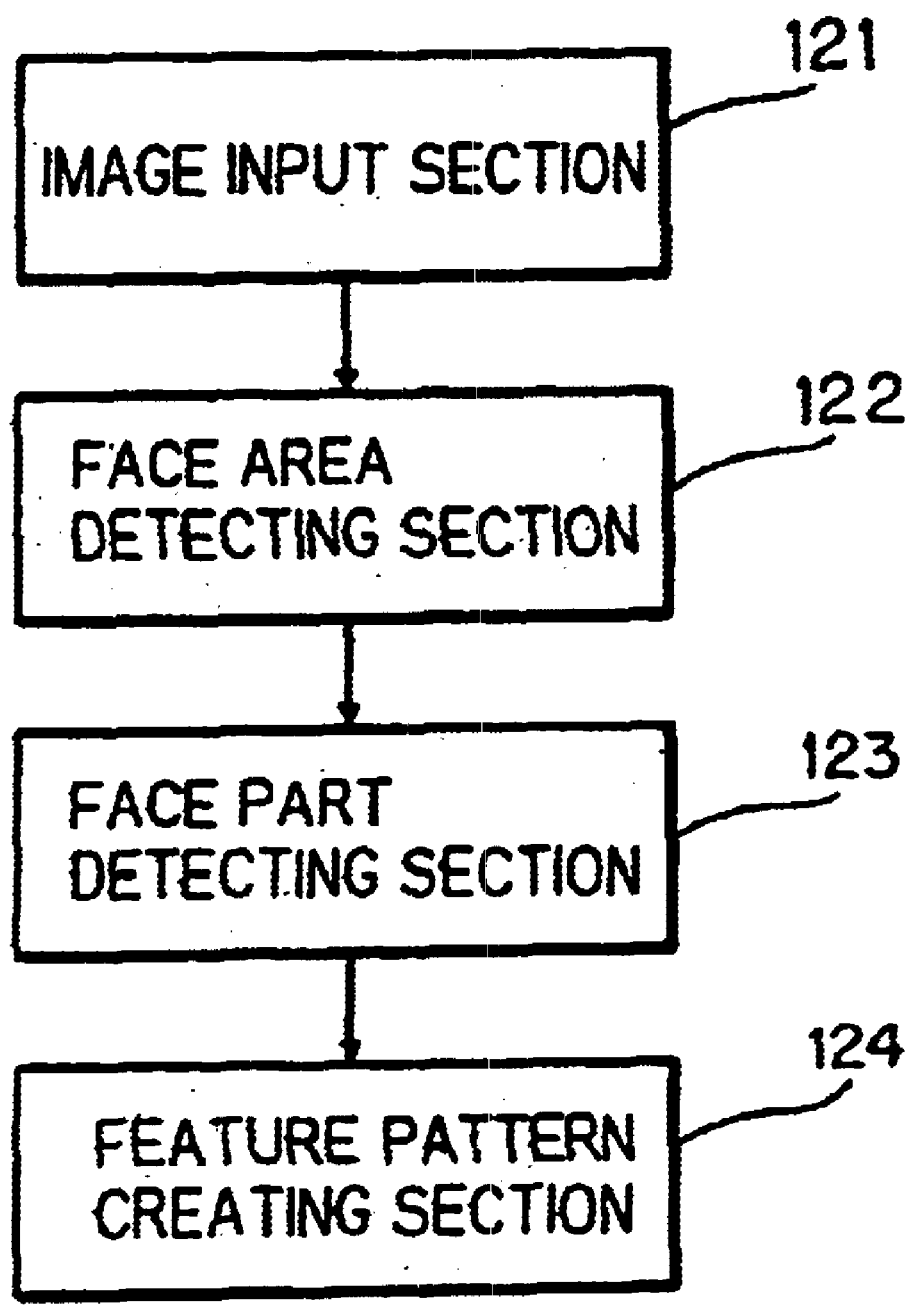
FIG. 3 is a configuration diagram of a feature pattern extracting section 12.

FIG. 3 shows a configuration of the feature pattern extracting section 12 comprising an image input section 121, a face area detecting section 122, a facial parts detecting section 123 and a feature pattern creating section 124.

The image input section 121 inputs therein a facial image through an TV camera to perform A/D conversion and then send it to the face area detecting section 122.

The face area detecting section 122 detects a face area out of the image.

The face area detecting section 122 uses a detecting method to move a previously prepared template in an image to determine a correlation value thereby obtaining a highest correlation value point as a face area.

Alternatively, it may be a face detecting means such as a face extracting method utilizing an eigenspace method or subspace method.

The facial parts detecting section 123 then detects facial parts such as an eye, nose and mouth.

Next the facial parts detecting section 123 detects positions of an eye and nose in detected face area region. The detecting method may use a method such as disclosed in a document ("Facial Feature Point Extraction Method Based on Combination of Shape Extraction and Pattern Matching": Kazuhiro Fukui and Osamu Yamaguchi, The transactions of the institute of electronics, information and communication engineers, D-II, vol. J80-D-II, No. 8, pp 2170–2177 (1997)).

Next the feature pattern creating section 124 crop a face area into given size and shape based on positions of a detected part, and use its light-and-shade information as a feature pattern. The image intensity value of an area with m×n pixels is herein used as information, and m×n dimensional information is used as feature vector.

Instead of using image intensity information, another information such as edge intensity information may be used.

An upper figure in FIG. 4 is face image data obtained through processing an input image by the feature pattern extracting section 12, which is obtained from temporal image sequences.

Subspace Calculating Section 14

The subspace calculating section 14 determines a correlation matrix (or covariance matrix) for feature vectors and, by its K–L expansion, determine an orthonormal vector (eigenvector), thereby calculating for a subspace.

The subspace is expressed by using a set of eigenvectors in number k corresponding to eigenvalues and singled out in the order of greater eigenvalue.

In the present embodiment, a correlation matrix Cd is determined from feature vectors and diagonized as correlation matrix $Cd = \Phi d \ \Lambda d \ \Phi d^T$, thereby determining an eigenvector matrix $\Phi d$.

FIG. 4 is face image patterns obtained through processing the input image by the feature pattern extracting section 12. The subspace is computed from the correlation matrix of the feature vectors, and the eigenvectors are calculated by K–L expansion of the correlation matrix.

The lower figure of FIG. 4 is represented by imaging the eigenvectors.

This subspace is utilized as an identification dictionary for identifying a person.

Registration may be previously made to register it as a dictionary.

Otherwise the subspace itself may be used as input data for identification, as will be stated later. Accordingly, a result of calculation by the subspace calculating section 14 is sent to a recognition section 16 or registered information holding section 18.

Recognition Section 16

Now the recognition section 16 is explained.

The recognition section 16 compares recognition data (subspace) stored in the registered information holding section 18 with a feature pattern obtained in the feature pattern extracting section 12 or a subspace obtained in the subspace calculating section 14, thereby identifying as to who is a person taken by the camera or whether it is the relevant person or not.

In order to identifying a person, it is satisfactory to determine what person data is most resembled to. A result of identification may be obtained as a person who corresponds to the data with the maximum similarity value.

Meanwhile, where performing a facial authentication using a card, registration number, password number, key, etc., a similarity value is calculated to the identification data corresponding to personal information, such as each person's card or number. A threshold is set to make identification as the person when the similarity value exceeds the threshold.

The recognition method may employ the subspace method or composite similarity method where using the information by the feature pattern extracting section 12.

The recognition method in the present embodiment uses a mutual subspace method described in a document ("A Pattern Matching Method with Local Structure": by Kenichi Maeda and Sadakazu Watanabe, The transaction of the institute of electronics, information and communition engineers (D), vol. J68-D, No. 3, pp 345–352 (1985)).

In this method, the recognition data in pre-registered information and the data to be inputted are expressed as subspaces, and the "angle" given by the two subspace is defined as a similarity value. The subspace inputted is referred to as an input subspace.

A correlation matrix Cin is calculated from the input data sequence in the similar manner and diagonized as $Cin = \Phi in \ \Lambda in \ \Phi in^T$, thereby determining an eigenvector $\Phi in$.

The inter-subspace similarity (0.0–1.0) is determined on the two subspaces expressed by $\Phi in$ and $\Phi d$, which are taken as a similarity value for recognition.

Figure 5:
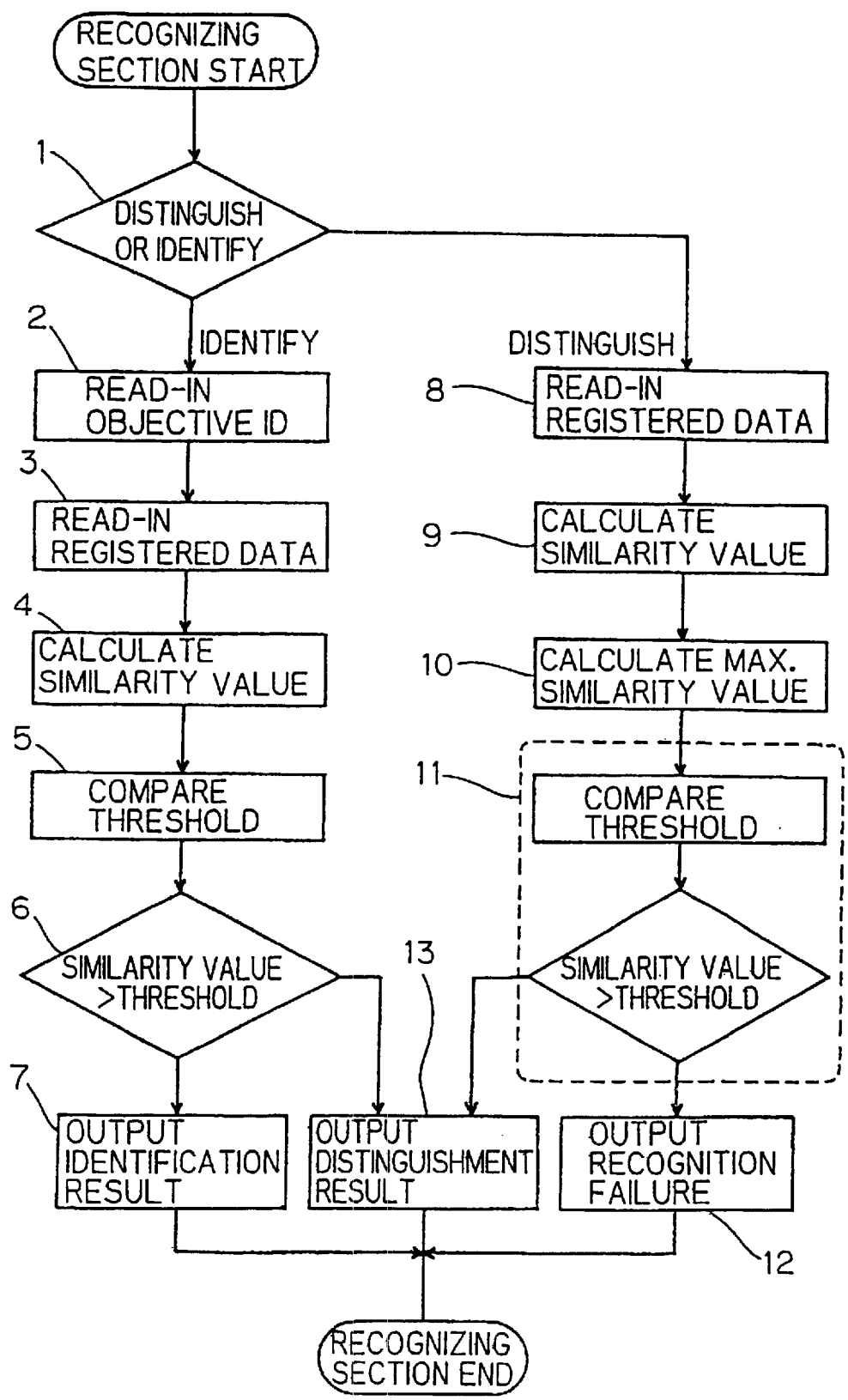
FIG. 5 is a flowchart for a recognition section 16.

The recognition section 16 operates as in FIG. 5.

First, the recognition section 16 operates different work depending on whether to perform distinguishment or identification (step 1).

When performing identification, a target identification code for a target person is first read in (step 2).

Then registered information (subspace) corresponding to the target identification code is read from the registered information holding section 18 (step 3).

Then similarity value is calculated between the subspace of the registered information and the input vector (feature vector from the feature pattern extracting section 12) or the input subspace (step 4).

Then a threshold used in setting the similarity value is compared (steps 5, 6) and a result of recognition is outputted (step 7).

When performing distinguishment, all the data to be considered for distinguishment is read out from the registered information holding section 18 (step 8).

They are then calculated for similarity values to respective ones of registered information (step 9).

Then a maximum one is singled out of the similarity values calculated (step 10) and outputted as a recognition result (step 12).

As shown by a step 11 enclosed by broken lines in FIG. 5, it is also possible to verify as to whether the recognition result is correct or not by comparing the maximum similarity with the threshold (step 13). For example, where the similarity value is excessively low, it can also be determined that there are no recognized targets.

The similarity value and determination result calculated here is also sent to the registered information updating section 20, and utilized as information for updating.

Registered Information Holding Section 18

The registered information holding section 18 can accumulate subspaces (or correlation matrix, etc.) utilized for person identification or situational information, such as registration time, day and hour, site, etc. They may be image input data or extracted feature patterns.

The registered information holding section 18 holds not only subspaces but also a correlation matrix at a prior stage for calculating a subspaces.

The registered information holding section 18 holds one or a plurality of recognition data corresponding to one person or a certain identification code. The subspace is memorized together with its accompanying information such as its acquired time. Also, these of the registered information are newly created, modified, deleted or the like by instructions from the registered information updating section 20.

The reason of holding multiple recognition data includes to make recognition on a plurality of subspaces for one person which are simultaneously sent to the recognition section 16.

Figure 6B:
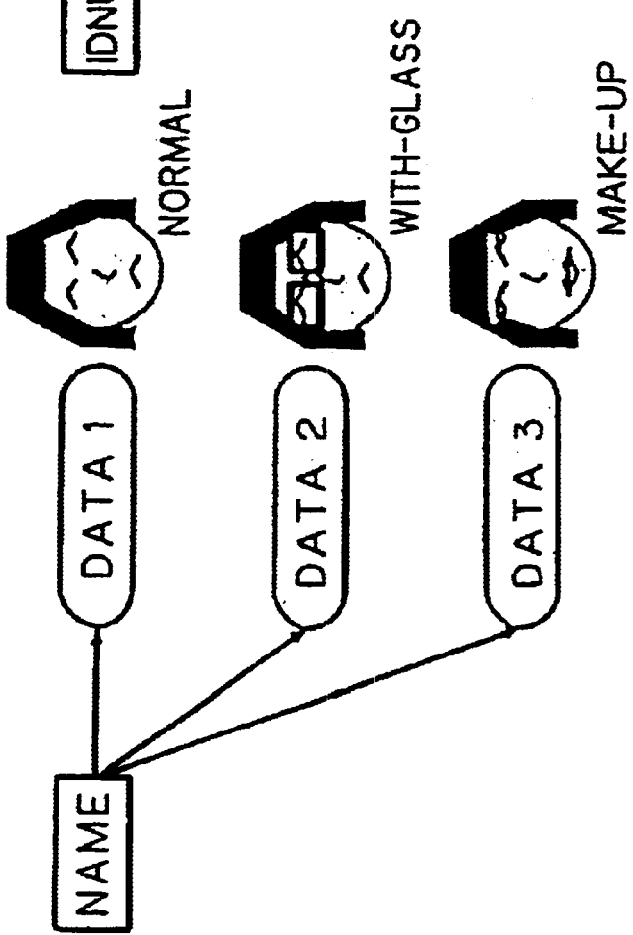
FIGS. 6(a) and 6(b) are explanatory diagrams of recognition date multiplexing.
Figure 6A:
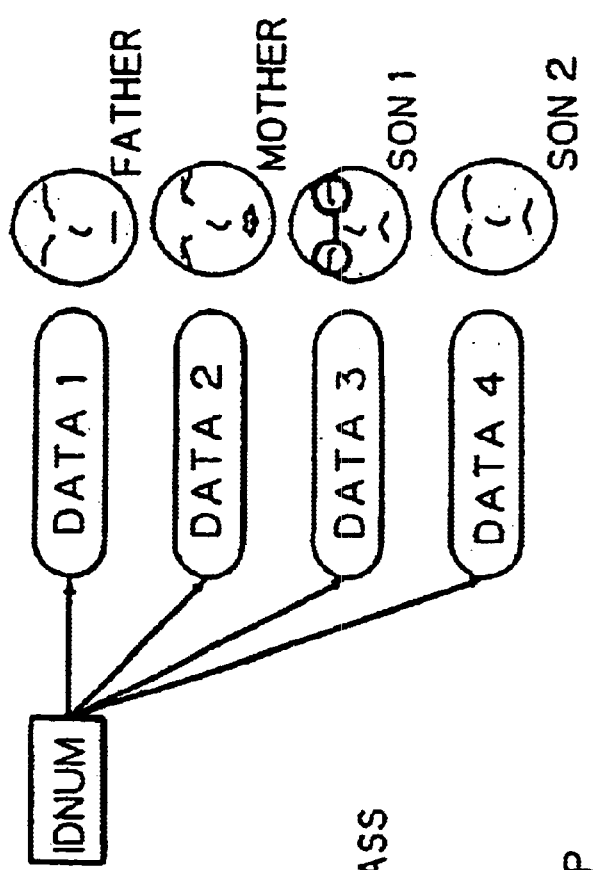

In FIG. 6(*a*) shows an example wherein multiple recognition data are prepared. For example,where change frequently occurs such as wearing on eye glasses and taking off the eye glasses, two of recognition data are prepared. When identification with any of the prepared recognition data is made, it is determined that person-identification is made.

Besides eye glasses, it is possible to utilize to determine on the presence or absence of a women makeup.

This relieves a user of a burden of taking off eye glasses with troublesomeness for authentication.

Figure 7:
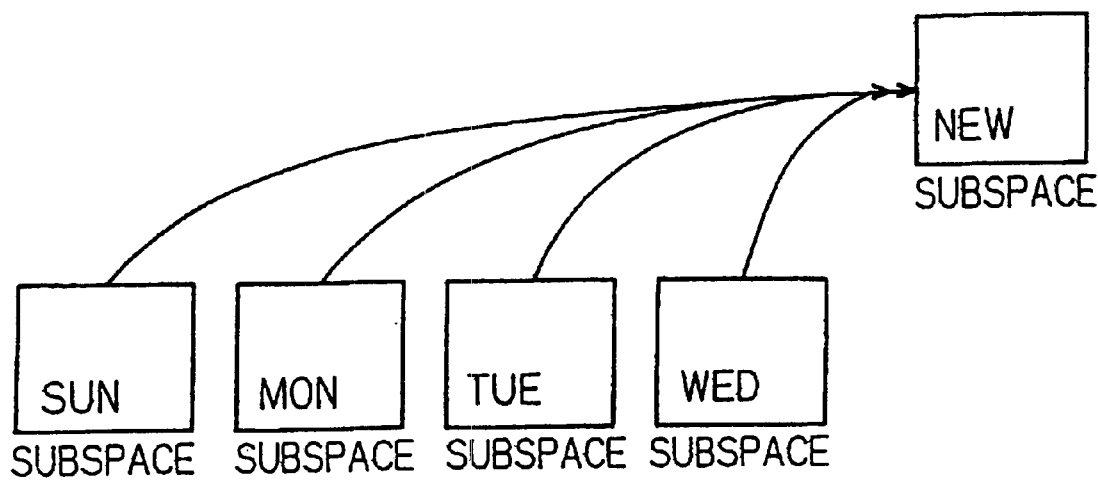
FIG. 7 is an explanatory view of recognition data combining.

Also, one subspace may be newly calculated from different ones of data which are obtained different in day and hour, as shown in FIG. 7. The multiple data are held in order to achieve recognition using the subspace. This will be explained in the registered information updating section 20.

Also, FIG. 6(*b*) shows an example wherein multiple recognition data are prepared for one code. For example, where facial authentication is utilized in security with a "card usable by family members", there is a requirement to deal with multiple face information.

In this case, recognition data in the number of family members are prepared for the numbers given for the card. When identified with any one, it is determined that identification through the recognition data is made.

This provides for improvement in convenience. There is of course no limitation to a family case.

Registered Information Updating Section 20

The registered information updating section 20 performs an update on the registered information in the registered information holding section 18, as required. The registered information updating section 20 comprises an update determining section 201 for determining an update method and condition, and a update information creating section 202 for updating the registered information according to the determined method and condition.

Update Determining Section 201

Figure 9:
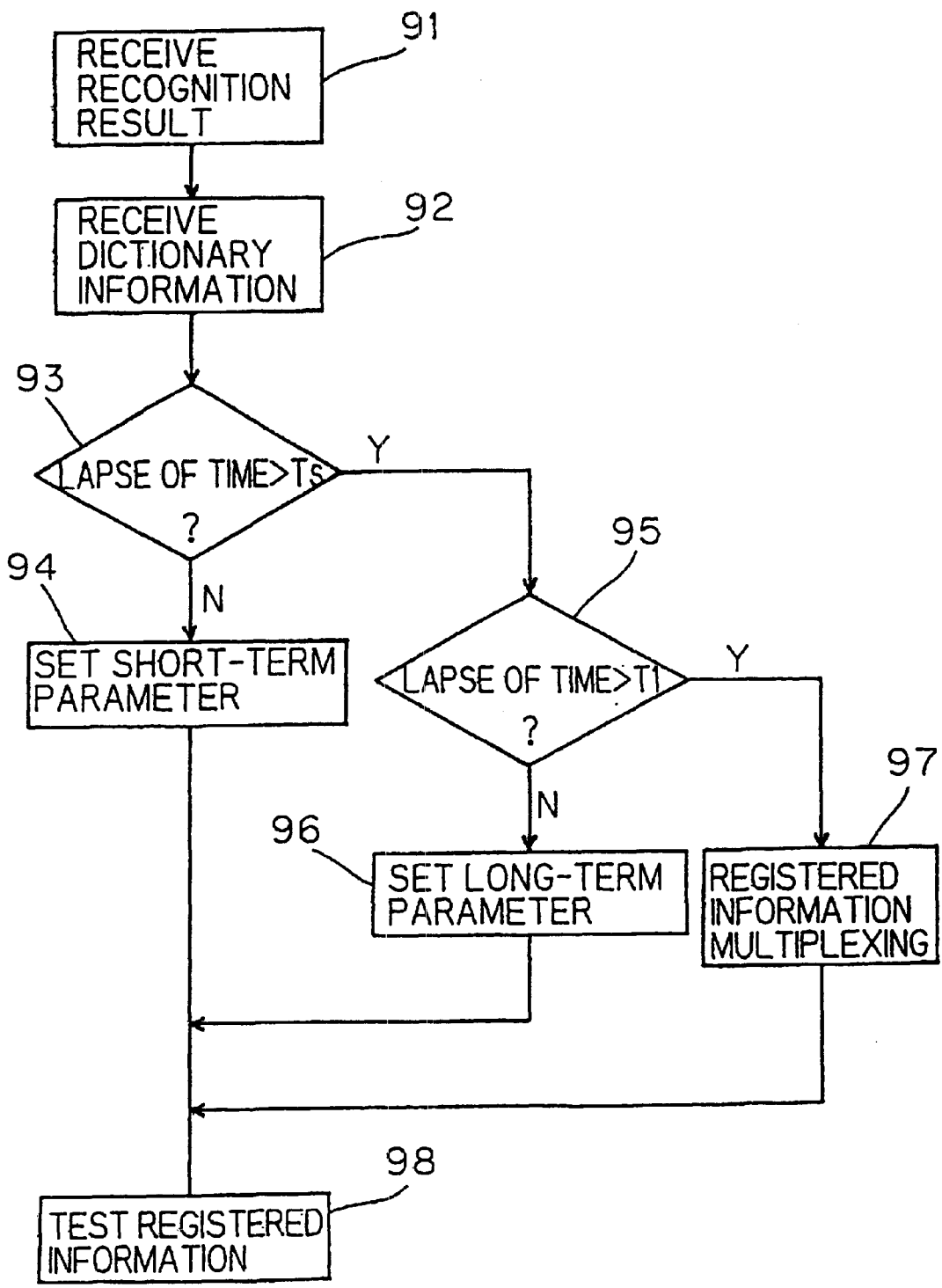
FIG. 9 is a flowchart for an update method.

The update determining section 201 in one example operates on a flowchart as shown in FIG. 9.

Update Determination Based On a Time Lapsing

The update determining section 201 receives a result of recognition (input data and similarity value) performed by the recognition section 16 (step 91).

Then the information of recognition data having been recognized is obtained from the registered information holding section 18 (step 92). This makes it possible to know on which data has been used and to obtain a lapse time from a time of recognition.

Whether an update should be made or not is determined from the data recognized, a length of a lapse time for updating a dictionary and a similarity value. It is first determined whether an elapsed time is greater than Ts (step 93). If the elapsed time is comparatively small, an update parameter is set for short term (step 94). These parameters, although explained later, refers to $\alpha$, $\beta$ and $\gamma i$ in the later explanation.

Similarly, whether the elapsed time is greater than T1 is determined (step 95). If no recognition has been made for a long time period, a long term parameter is set (step 96). Further, where no recognition is made for a long time period, it may be considered that a great variation has occurred and multiplexing to render recognition data a multiple manner may be made (step 97). In this manner, an update method for the recognition data is decided. Incidentally, Ts and T1 are empirically determined.

Data Level Update Determination

As for the input information used in recognition which received at the step 91, a similarity value between its input data and the dictionary has been determined. The data is selected not to be preferably used for updating which includes, among the input data having been used in recognition, data with a similarity value sufficiently obtained, input data with excessive variation and the data that is mistaken in image processing (step 93).

First, each of the input data is roughly divided into the following three groups depending on the magnitude in similarity value.

A. input data exceeding by far a threshold for recognition (this input data is listed here because of high similarity value and no necessity to update using new data).

B. input data having a possibility of mistaking in recognition and not included in the dictionary.

C. input data having been recognized with clear mistake.

Figure 10:
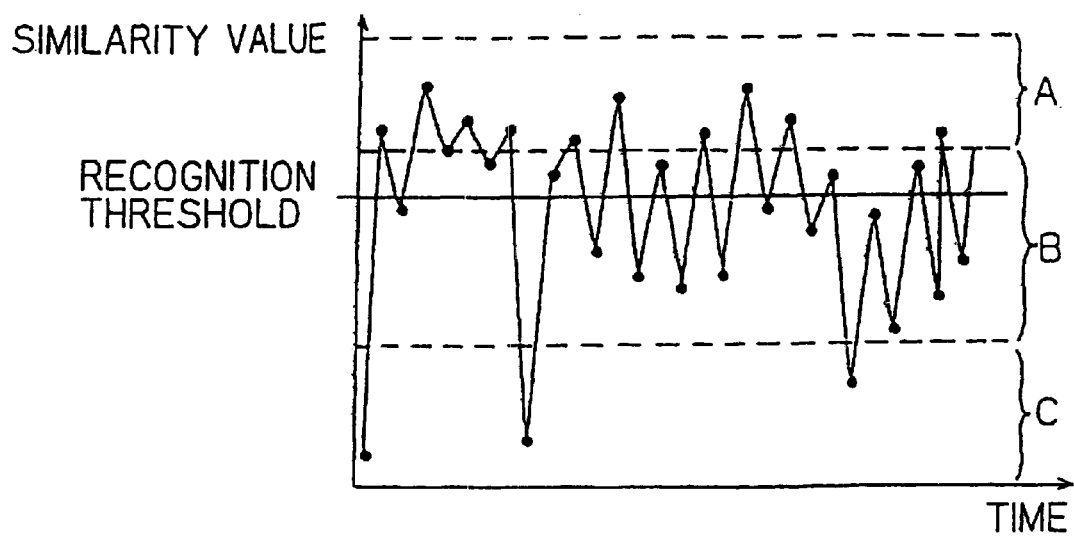
FIG. 10 is a graph where in similarity values are determined on data being inputted in time series to represent their changes in time in a graph.

FIG. 10 is a graph wherein similarity values are calculated on input data sequence (black dots in the figure) to represent their changes in time.

There are various ones of data with high and low similarity values as shown in FIG. 10. The data is selected into three groups, e.g., one belonging to A and B or one belonging only to B.

For example, it is possible, in the above update determination with time lapse, to configure such that both A and B of data are used for updating when lapse of time is long, while only the data belonging to B is used when lapse of time is short. Correlation matrices or subspaces are calculated on them, and sent to the update information creating section 202.

It is of course possible to previously determine similarity values using another evaluation criteria (recognition method) in order to conduct test independent of the recognition section 16.

For example, in the recognition section 16 similarity values may be calculated using different algorithms to select respective feature patterns such that a mutual subspace method is used to calculate a similarity value to perform person identification and recognition while a subspace method is used in test for updating.

Such algorithms may be installed irrespective of their forms, that is, the recognition section 16 may possess a means to calculate a plurality of algorithms or the recognition section 16 and the update determining section 201 may be provided with respective algorithm calculating means. This test for updating may be an authentication in a level of such feature patterns (input data) or an authentication in a level expressed by subspaces.

Update Information Creating Section 202

The update information creating section 202 creates new registered information using the data already registered and the data used in authentication.

The update method includes
1) a method to update a certain subspace
2) a method to combine a new subspace
3) a method to add a subspace having been used in recognition These are explained in order hereinbelow.

1) Method to Update a Certain Subspace

The present embodiment performs update in the following manner because correlation matrix is held in the recognition data.

It is assumed that a correlation matrix for the recognition data is Cd and a correlation matrix for the input data is Cin.

New recognition data (correlation matrix) is calculated based on the following equation from the above $$Cin = \alpha Cd + \beta Cin.$$

Here, the update method can be adjusted by varying setting of parameters $\alpha$ and $\beta$.

Assuming that $\alpha=1.0$ and $\beta=1.0$, addition is sequentially made and recognition data is made up using all the data collected so far.

Assuming that $\alpha=1.0$ and $\beta=1.0$, the update ratio with current data decreases but the increases in number of times decreases a contribution of time-elapsed data. For example, if updates are made n number of times, the contribution ratio of the first recognition data is $\frac{1}{2}^n$.

The parameters $\alpha$ and $\beta$ may be adjusted by taking into account lapse of time, and so on.

2) Method to Combining a New Subspace

Another embodiment is provided wherein a plurality of correlation matrices are held each time recognition is performed, and a subspace in a dictionary used for recognition is newly calculated from the correlation matrices.

For example, using correlation matrices Ci and weight coefficients $\gamma i$ accumulated by each recognition:

$$D = \sum_{i}^{n} \gamma i Ci$$

Using the matrix D, subspaces are calculated to obtain a dictionary (eigenvectors).

Figure 8:
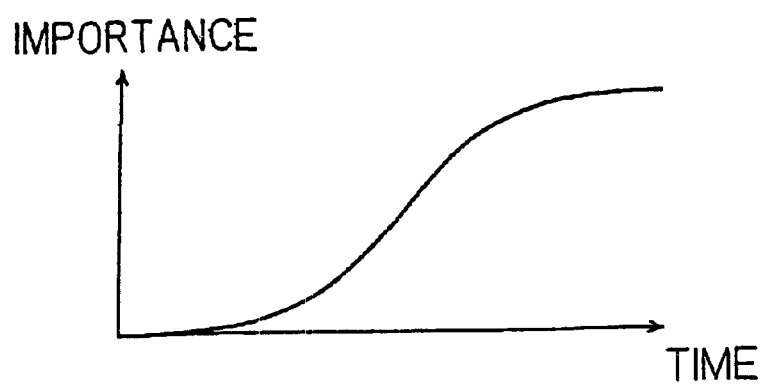
FIG. 8 is an explanatory graph of weight coefficient.

The weight coefficients $\gamma i$ are determined using a sigmoid function taking lapse of time into account, as shown in FIG. 8. It is of course possible to select another function for determining the weight coefficients. An empirical weight coefficient table may be prepared. Also, the number of correlation matrices Ci is not fixed.

The method of combining subspaces may, of course, utilize a method to calculate on common portions between subspaces, besides the above-stated additional calculation.

3) Method to Add Subspaces Used in Recognition

It is also possible to automatically multiplex in multiple recognition data.

For example, where exceeding a threshold but the similarity value is excessively low, Cin may be added as recognition data as they are to increase the number, instead of performing update as stated before.

Incidentally, although the correlation matrix was also held in order to calculate subspaces, a matrix $\Phi^T \Phi$ may be calculated, without having a correlation matrix, in place of a correlation matrix by using an eigenvector matrix $\Phi$ representative of subspaces.

In such a case, the memory capacity can be reduced as compared with holding a correlation matrix.

The subspaces are updated by appropriately using these method jointly or in combination, thereby maintaining accuracy of the dictionary and performing aging-suppressed recognition.

Modification

Although the present embodiment was explained on the recognition example using faces, voice prints may be used as feature patterns. Alternatively, other feature pattern may be utilized.

The present invention can be practiced in various modified forms within a range of not departing from its gist.

According to the present invention, it is possible to automatically update the registered information by using recognition information containing at least a subspace. Further, it is possible to increase resistance to variation, cope with aging change and maintain the recognition rate. That is, the effect of time and year aging changes are relieved by updating the registered information from time to time.

Besides being possible to eliminate the effect of time and year aging changes, it is also possible to eliminate the effect of change caused in a brief time, such as change in expression or face direction. In other words, a subspace calculated from a feature pattern is used as registered information in recognition procedure so as to absorb the change caused in a brief time and, in addition, to flexibly cope with the time and year aging changes.

If the registered data is updated by providing an automatic update mechanism using information upon recognition instead of explicit implementing, the recognition rate can be avoided from lowering without burdening on a person.

Furthermore, if multiple registered data is held in order to cope with large variation in the presence or absence of spectacles or makeup, the convenience is enhanced and the recognition rate is improved by collation with the multiple data.

What is claimed is:

1. A person recognizing apparatus, comprising:

a feature pattern extracting device which extracts a feature pattern obtainable from at least one person to be recognized;

a recognition information calculating device which calculates recognition information containing at least one subspace corresponding to each of said at least one person to be recognized, from a calculation amount extracted by said feature pattern extracting device;

a registered information holding device which holds recognition information corresponding to each of said at least one person to be recognized by said recognition information calculating device, as registered recognition information, or holds updating recognition information;

a recognizing device which recognizes the person by using recognition information calculated by said recognition information calculating device or a feature pattern extracted by said feature pattern extracting device and the registered recognition information held in said registered information holding device; and a registered information updating device which updates the registered recognition information held in said registered information holding device by using at least one of first, second, and third updating methods, said first updating method being to update the subspace included in said registered recognition information corresponding to each of said at least one person to be recognized by use of the recognition information calculated by said recognition information calculating device or the feature pattern extracted by said feature pattern extracting device, said second updating method being to combine a new subspace with the subspace by use of the recognition information and the feature pattern, and said third updating method being to add a subspace having been used in the recognition.

2. A person recognizing apparatus according to claim 1, wherein said registered information updating device includes:
- an update determining device which determines a predetermined method as to update of the registered recognition information by said registered information holding device; and
- an update information creating device which creates new registered recognition information based on the update method determined by said update determining device by using the recognition information calculated by said recognition information calculating device or the feature pattern extracted by said feature pattern extracting device.

3. A person recognizing apparatus according to claim 1, wherein:
- said registered information holding device holds the registered recognition information in multiple manner concerning one objective person or one group; and
- said recognizing device recognizes with use of registered recognition information in multiple manner concerning the one objective person or the one group in said registered information holding device.

4. A person recognizing apparatus according to claim 2, wherein:
- said update determining device selects recognition information to be updated among the recognition information calculated by said recognition information calculating device based on a predetermined rule; and
- said update information creating device includes an update information creating device which creates new registered recognition information by using the selected recognition information by said update determining device.

5. A person recognizing device according to claim 2, wherein:
- said update determining device determines an update condition based on a time of registering or updating the registered recognition information used by said recognizing device; and
- said update information creating device including an update information creating device which creates new registered recognition information based on the update condition determined by said update determining device.

6. A person recognizing apparatus, comprising:
- a feature pattern extracting device which extracts a feature pattern obtainable from a person to be recognized;
- a recognition information calculating device which calculates recognition information containing at least a subspace from a calculation amount extracted by said feature pattern extracting device;
- a registered information holding device which holds multiple recognition information by said recognition information calculating device, as registered recognition information, or holds updating recognition information;
- a recognizing device which recognizes the person by using recognition information calculated by said recognition information calculating device or a feature pattern extracted by said feature pattern extraction device and the registered recognition information held in said registered information holding device, wherein said recognizing device makes recognition using a method of calculating a similarity value;
- a registered information updating device which updates the registered recognition information concerning the person held in said registered information holding device by using the recognition information calculated by said recognition information calculating device or the feature pattern extracted by said feature pattern extracting device;
- wherein said registered information updating device includes:
  - an update determining device which determines a predetermined method as to update of the registered recognition information by said registered information holding device wherein said update determining device selects recognition information to be updated among the recognition information calculated by said recognition information calculating device based on a predetermined rule, and said update determining device uses another method of calculating a similarity value different from the method of calculating a similarity value by said recognizing device; and
  - an update information creating device which creates new registered recognition information based on the update method determined by said update determining device by using the recognition information calculated by said recognition information calculating device or the feature pattern extracted by said feature pattern extracting device wherein said update information creating device includes a device which creates new registered recognition information by using the recognition information selected by said update determining device.

* * * * *